United States Patent
Cheng et al.

(10) Patent No.: US 9,313,709 B2
(45) Date of Patent: Apr. 12, 2016

(54) METHODS FOR CALL MANAGEMENT WITH MULTIPLE SUBSCRIBER IDENTITY CARDS AND APPARATUSES USING THE SAME

(71) Applicant: MediaTek Inc., Hsin-Chu (TW)

(72) Inventors: Yi-Ting Cheng, Taipei (TW);
Pei-Shiuan Ho, Taichung (TW);
Yu-Ting Chen, Chiayi County (TW);
Keng-Ming Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 139 days.

(21) Appl. No.: 14/080,983

(22) Filed: Nov. 15, 2013

(65) Prior Publication Data

US 2015/0139181 A1     May 21, 2015

(51) Int. Cl.
| | |
|---|---|
| *H04W 36/14* | (2009.01) |
| *H04W 68/12* | (2009.01) |
| *H04L 12/46* | (2006.01) |
| *H04W 76/02* | (2009.01) |
| *H04W 76/06* | (2009.01) |

(52) U.S. Cl.
CPC ............. *H04W 36/14* (2013.01); *H04W 68/12* (2013.01); *H04W 76/066* (2013.01); *H04L 12/4633* (2013.01); *H04W 76/028* (2013.01); *H04W 76/064* (2013.01)

(58) Field of Classification Search
None
See application file for complete search history.

(56) References Cited

U.S. PATENT DOCUMENTS

| | | | |
|---|---|---|---|
| 2011/0280166 A1 | 11/2011 | Nien et al. | |
| 2012/0135715 A1* | 5/2012 | Kang et al. | 455/412.1 |
| 2013/0065644 A1* | 3/2013 | Bishop et al. | 455/558 |
| 2015/0094071 A1* | 4/2015 | Hang et al. | 455/450 |

FOREIGN PATENT DOCUMENTS

| | | |
|---|---|---|
| EP | 2 239 981 | 10/2010 |
| EP | 2 605 556 | 6/2013 |
| EP | 2 642 807 | 9/2013 |

\* cited by examiner

*Primary Examiner* — Vinncelas Louis
(74) *Attorney, Agent, or Firm* — McClure, Qualey & Rodack, LLP

(57) ABSTRACT

An embodiment of a method for call management, performed by a processing unit of a UE (user equipment), is disclosed. The method is employed in a hardware configuration of at least two subscriber identity cards sharing a radio resource. A PS (packet-switched) service is first provided for the first subscriber identity card. Packet data transmission and reception is handed over to a second PS service with the second subscriber identity card from the first PS service after receiving a call request requesting a CS (circuit-switched) service with the second subscriber identity card.

16 Claims, 9 Drawing Sheets

METHODS FOR CALL MANAGEMENT WITH MULTIPLE SUBSCRIBER IDENTITY CARDS AND APPARATUSES USING THE SAME

BACKGROUND

1. Technical Field

The present invention relates to call management, and in particular to methods for call management with multiple subscriber identity cards and apparatuses using the same.

2. Description of the Related Art

A UE (user equipment) is capable of receiving data from and transmitting data to a base station in compliance with the GSM/GPRS/EDGE (Global System for Mobile communications/General Packet Radio Service/Enhanced Data rates for GSM Evolution), WCDMA (Wideband Code Division Multiple Access), CDMA2000, UMTS (Universal Mobile Telecommunications System), TD-SCDMA (Time Division—Synchronous Code Division Multiple Access), LTE (Long Term Evolution), FD-LTE (Frequency Division—Long Term Evolution), or TD-LTE (Time Division—Long Term Evolution). GSM, EDGE, WCDMA, CDMA2000, UMTS, TD-SCDMA, LTE, FD-LTE, or TD-LTE is a communications standard permitting mobile users of wireless communications devices exchange data over a telephone system wherein radio signals carry data to and from the wireless devices. A UE may be equipped with two or more SIM (subscriber identity module) cards prepared by the same or different network operators, and the SIM card shares a single radio resource, such as an antenna, and/or a RF (radio frequency) module. One SIM card (referring to a first SIM card) may use a PS (packet-switched) service to surf the Internet, send/receive emails or instant messages, upload/download data files, etc. The PS service used by the first SIM card is interrupted conventionally to lease the single radio resource when the UE attempts to use a CS (circuit-switched) service with another SIM card (referring to a second SIM card), for example, answering an MT (mobile-terminated) call to a phone number associated with the second SIM card, making an MO (mobile-originated) call from the phone number associated with the second SIM card, etc. Thus, applications often consume additional time to recover the PS data service before continuing the interrupted PS data transceiving. Accordingly, there is a need for a UE that provides the capability of maintaining the ongoing PS data transceiving and uses a CS service with the second SIM card.

BRIEF SUMMARY

An embodiment of a method for call management, performed by a processing unit of a UE (user equipment), is disclosed. The method is employed in a hardware configuration of at least two subscriber identity cards sharing a radio resource. A PS (packet-switched) service is first provided for the first subscriber identity card. Packet data transmission and reception is handed over to a second PS service with the second subscriber identity card from the first PS service after receiving a call request requesting a CS (circuit-switched) service with the second subscriber identity card.

An embodiment of an apparatus for call management with a first subscriber identity card and a second subscriber identity card, which share a radio resource, is disclosed. The apparatus contains at least a processing unit. The processing unit provides a first PS service for the first subscriber identity card via the shared radio resource, and hands over packet data transmission and reception via the shared radio resource to a second PS service for the second subscriber identity card from the first PS service after receiving a call request requesting a CS service with the second subscriber identity card.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
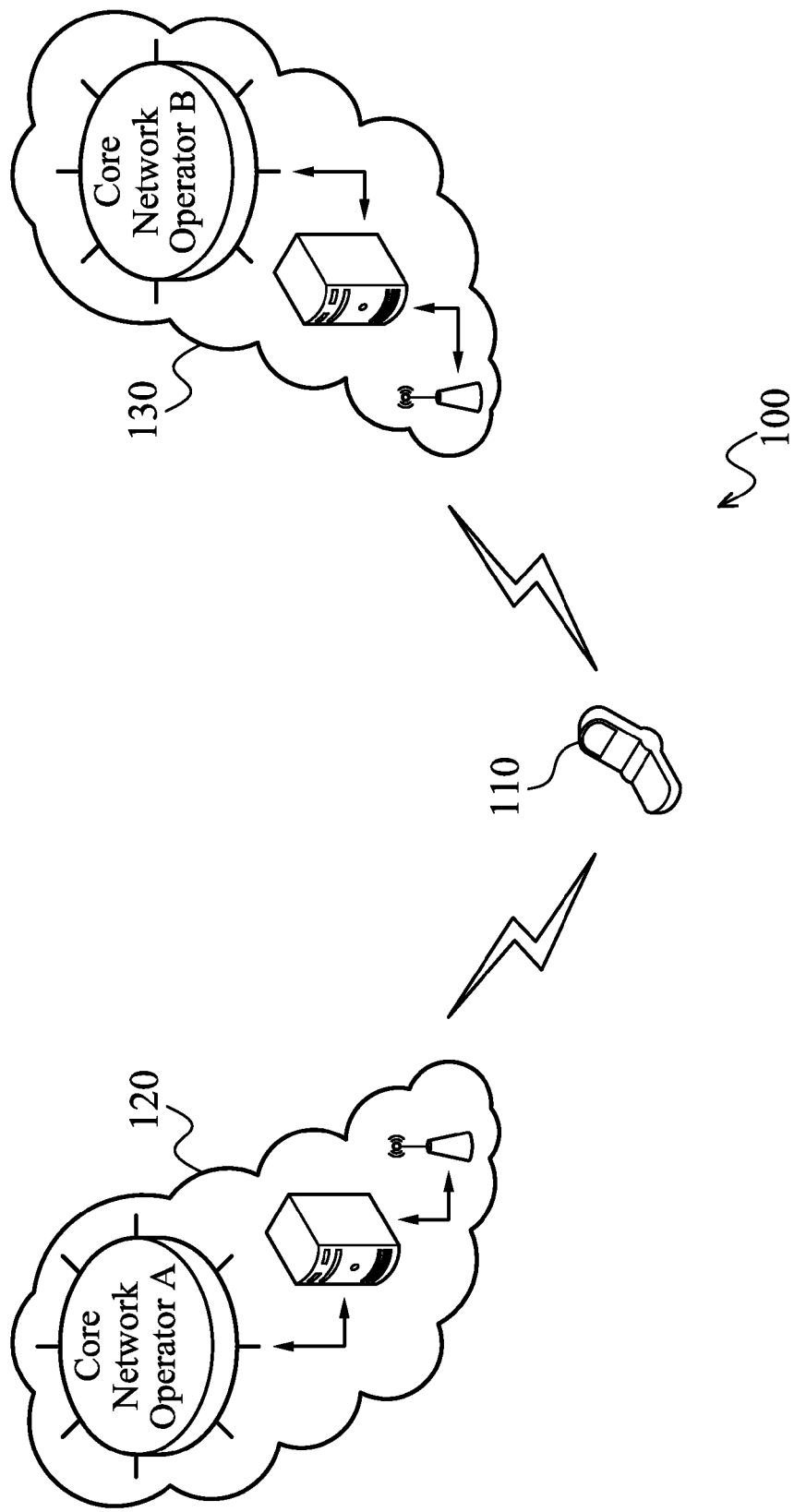
FIG. 1 is a block diagram of a wireless communications environment according to an embodiment of the invention.

FIG. 1 is a block diagram of a wireless communications environment according to an embodiment of the invention. The wireless communications environment 100 contains at least a UE (user equipment) 110, and cellular networks 120 and 130. The term "UE" may be alternatively referred as MS (mobile station) by those skilled in the art. The UE 110 may wirelessly communicate with the cellular networks 120 and 130 with two separate subscriber numbers and/or two separate subscriber identities, after camping on two cells. The cell may be managed by a node-B, a BS (base station), an ABS (advanced BS), an EBS (enhanced BS), or others. However, the communication is only allowed to be performed with one of the two cellular networks 120 and 130 at a given time. The cellular networks 120 and 130 may be in compliance with any of the GSM/GPRS/EDGE, WCDMA, CDMA 2000, UMTS, TD-SCDMA, LTE, FD-LTE and TD-LTE technologies. The GSM/GPRS/EDGE may be referred to as 2G technology. The WCDMA, CDMA 2000, UMTS and TD-SCDMA may be collectively referred to as 3G technology. The LTE, FD-LTE and TD-LTE may be collectively referred to as 4G technology. The cellular networks 120 and 130 may be operated by the same or different operators using the same or different Radio Access Technologies (RATs). For example, the cellular networks 120 and 130 may be operated by different operators of the core network operator A and core network operator B. The UE 110 may be equipped with two dual or triple RAT subscriber identity cards or alternatively, the UE 110 may be equipped with one dual or triple RAT subscriber identity card and one single RAT subscriber identity card, wherein the invention is not limited thereto. The single RAT may be the 2G, 3G or 4G technology. The dual RAT may be the 2G/3G, 3G/4G or 2G/4G technologies. The triple RAT may be the 2G/3G/4G technologies. For example, the cellular network 120 may be a 2G/3G system while the cellular network 130 may be a 3G or 4G system. The UE 110 may also be equipped with three or more subscriber identity cards according to different design requirements of the UE 110.

Figure 2:
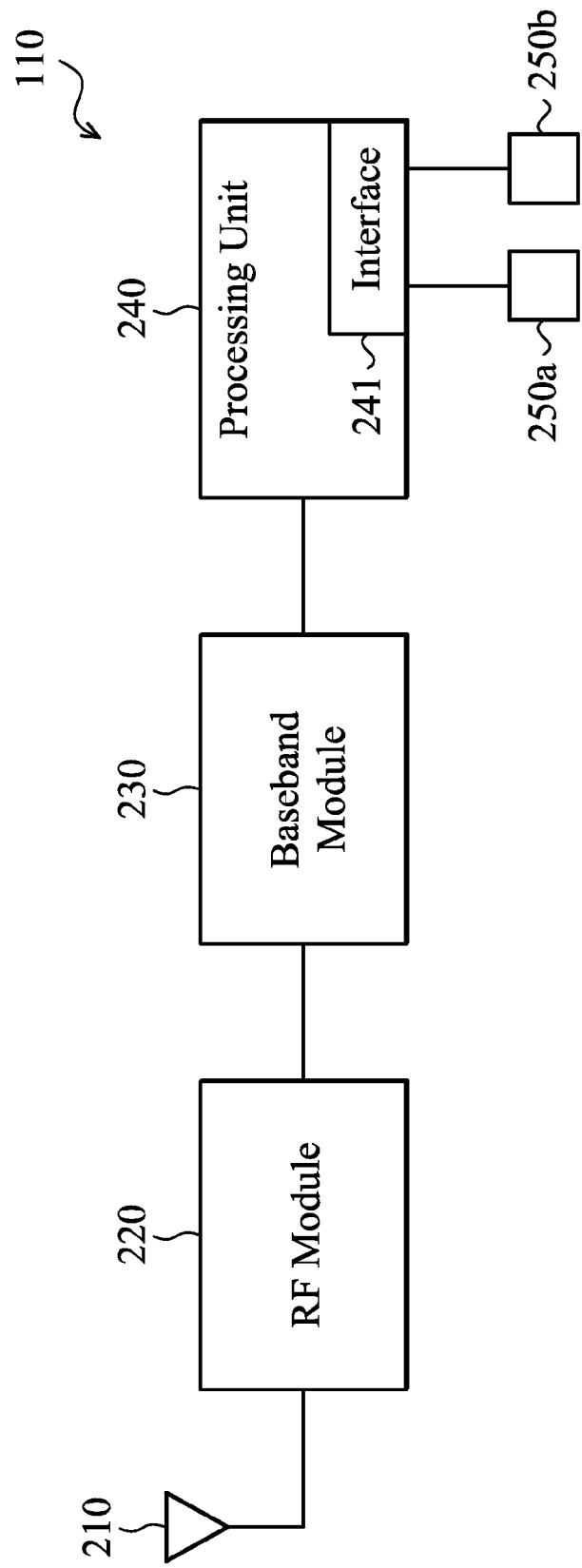
FIG. 2 shows the hardware architecture of a UE (user equipment) equipped with two subscriber identity cards according to an embodiment of the invention.

FIG. 2 shows the hardware architecture of a UE equipped with two subscriber identity cards according to an embodiment of the invention. The UE 110 having a communications interface conforming to a wireless communications protocol and transceiving RF (radio frequency) signals in a cellular network through the antenna 210 contains at least an RF module 220, a baseband module 230, and a processing unit 240. The baseband module 230 may contain a plurality of hardware devices to perform baseband signal processing. The baseband signal processing may include ADC/DAC (analog-to-digital conversion/digital-to-analog conversion), gain adjusting, modulation/demodulation, encoding/decoding, etc. The RF module 220 may receive RF wireless signals, convert the received signals to baseband signals, which are processed by the baseband module 230, or receive baseband signals from the baseband unit 230 and convert the received signals to radio frequency wireless signals, which are later transmitted. The RF module 220 may also contain a plurality of hardware devices to perform radio frequency conversion. For example, the RF module 220 may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in WCDMA systems, or others depending on the RAT in use. The antenna 210 is arranged to transmit or receive the RF signals to or from the cellular network via the air interface. The processing unit 240 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The processing unit 240 may provide an interface 241 to interact with two or more inserted subscriber identity cards 250a, 250b and the like. The subscriber identity card 250a or 250b may be a SIM (subscriber identity module) or USIM (universal SIM) card, or others, contain user account information, an IMSI (International Mobile Subscriber Identity) and a set of SAT (SIM Application Toolkit) commands, and provide storage space for phone book contacts. The processing unit 240 may interact with a MPU (micro-processing unit) of the subscriber identity card 250a or 250b to fetch data or SAT commands from the plugged-in the subscriber identity card 250a or 250b. According to the embodiments of the invention, radio resources, such as the antenna 210, the RF module 220 and the baseband module 230, are shared between different subscriber identity cards 250a and 250b with the aid of detailed arrangements and scheduling performed by the processing unit 240. The user account of the subscriber identity card 250a or 250b may be granted permission to use the CS (circuit-switched) and/or PS (packet-switched) service of a cellular network. By using the CS service for a subscriber identity card, the UE 110 may establish a dedicated communications channel with the camped-on cell, and it guarantees the full bandwidth of the dedicated communications channel and remains connected for the duration of the communication session. By using the PS service for a subscriber identity card, the UE 110 may divide the data to be transmitted into packets, which are transmitted through the cellular network and, if required, the Internet. The RF module 220 and the baseband module 230 are conceptual blocks, and the physical hardware arrangements may be analogous to those described in U.S. Pat. No. 8,121,843 (Huang et al.), and/or U.S. Pat. No. 8,514,798 (Lee et al.), and/or U.S. Patent Publication US2011/0195749A1 (Lan), and/or US2011/0195749A1 (Lee et al.), each of which is hereby incorporated by reference.

Figure 3:
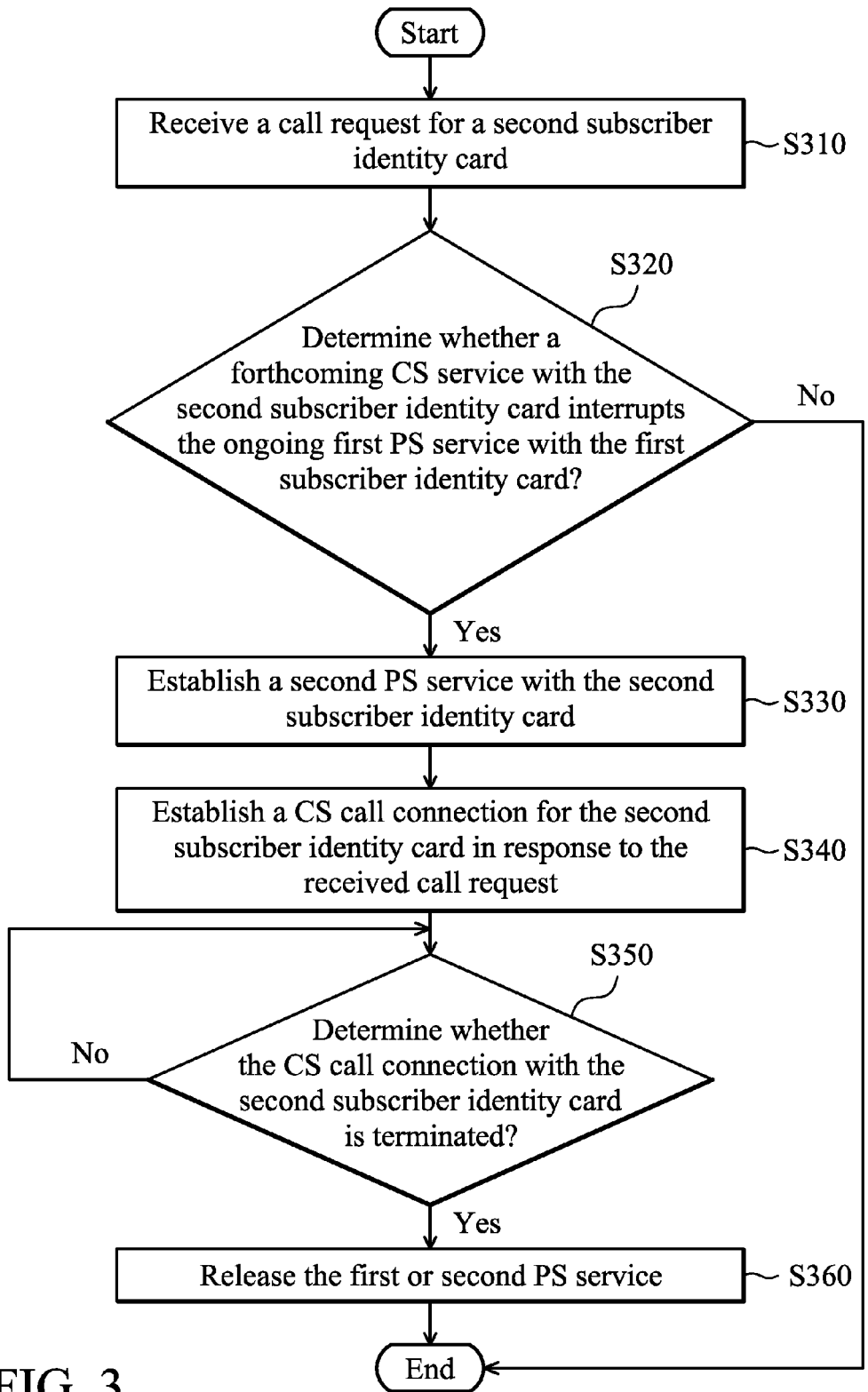
FIG. 3 is a flowchart showing a method for call management with multiple subscriber identity cards according to an embodiment of the invention.

FIG. 3 is a flowchart showing a method for call management with multiple subscriber identity cards according to an embodiment of the invention. The method is performed when the processing unit 240 loads and executes microcode or software instructions. The method may be implemented in a MAC (Medium Access Control) layer to control the access of the UE 110 on the radio channels. The processing unit 240 may control the shared radio resource to complete the wireless signaling exchange recited as follows. Assume that a PS service (referred to as a first PS service through this exemplary method) is provided for one subscriber identity card (referred as a first subscriber identity card through this exemplary method) to transmit or receive data packets to or from a cellular network: When a CS service for another subscriber identity card (referred to as a second subscriber identity card through this exemplary method) is going to be or has been established in response to a call request, the process is used to establish a PS service (referred as a second PS service through this exemplary method) provided for the second subscriber identity card and hand over the packet data transmission and reception to the second PS service from the first PS service, such that the packet data transmission and reception continues without interruption. The process begins to receive a call request for the second subscriber identity card (step S310). In one embodiment, the call request may indicate that a MT (mobile-terminated) call paging to a subscriber identity of the second subscriber identity card has been received and it needs a decision from the user whether to answer the MT call. The UE 110 would interact with a corresponding cellular network to establish a CS call connection (referred as a CS service) for the second subscriber identity card after the user decides to answer the MT call. In another embodiment, the call request may indicate that the user is attempting to make a MO (mobile-originated) call with the second subscriber identity card. The UE 110 would interact with a corresponding cellular network to establish a CS call connection for the second subscriber identity card in response to the MO call attempt. The UE 110 may provide a MMI (man-machine interface) to help the user to answer or reject the MT call to the subscriber identity of the second subscriber identity card, or make the MO call through the second subscriber identity card. Subsequent to step S310, it is determined whether a forthcoming CS service with the second subscriber identity card is interrupting the ongoing first PS service with the first subscriber identity card (step S320). If so (the "Yes" path of step S320), the second PS service for the second subscriber identity card is established (step S330) and a CS call connection for the second subscriber identity card is established in response to the received call request (S340); otherwise (the "No" path of step S320), the process ends. For example, the process proceeds to step S330 when the user decides to answer the MT call paging; otherwise, the process ends when the user rejects the MT call paging. The second PS service could be utilized to continue the data packet transmission and reception, which was originally performed through the first PS service. An IP (Internet Protocol) address (referred as a second IP address through this exemplary method) is assigned for the second PS service, different from the IP address assigned for the first PS service (referred as a first IP address through this exemplary method), and it may need to additionally perform a NAT (network address transition) to continue the data packet transmission and reception. For example, each of the source addresses of the outgoing data packets obtained from an application is first replaced with the second IP address and then sent out, where the application may be a file transfer, e-mail transfer, or audio/video playback application, or a Web browser, or others. Each of the destination addresses of the incoming packets obtained from the cellular network 120 or 130 is replaced with the first IP address, and fed to the application. By using the NAT, the application needs no additional effort to alter its ordinary process to respond to the change of the PS service source. It is known by those skilled in the art that once the CS and PS services are provided by the same network operator, the PS service can be maintained while the CS voice call is ongoing, which is governed by the network operator. If the CS and PS services are provided by different network operators, the PS service may be sacrificed because the shared radio resource should be dedicated to the CS service. It is to be understood that the CS and PS services for the second subscriber identity card may be established using different or the same RAT, and the invention should not be limited thereto. Those skilled in the art will appreciate that the order of steps S330 and S340 may be swapped, and the invention should not be limited thereto. Next, the process periodically determines whether the CS call connection with the second subscriber identity card is terminated (step S350). It is to be understood that steps S320 to S350 may be collectively referred as a macro step for handing over packet data transmission and reception to the second PS service from the first PS service. After determining that the CS call connection is terminated (the "Yes" path of step S350), the first or second PS service is released (step S360). It may need to cancel the NAT when the second PS service is terminated; otherwise, the NAT is maintained when the first PS service is terminated.

Figure 4:
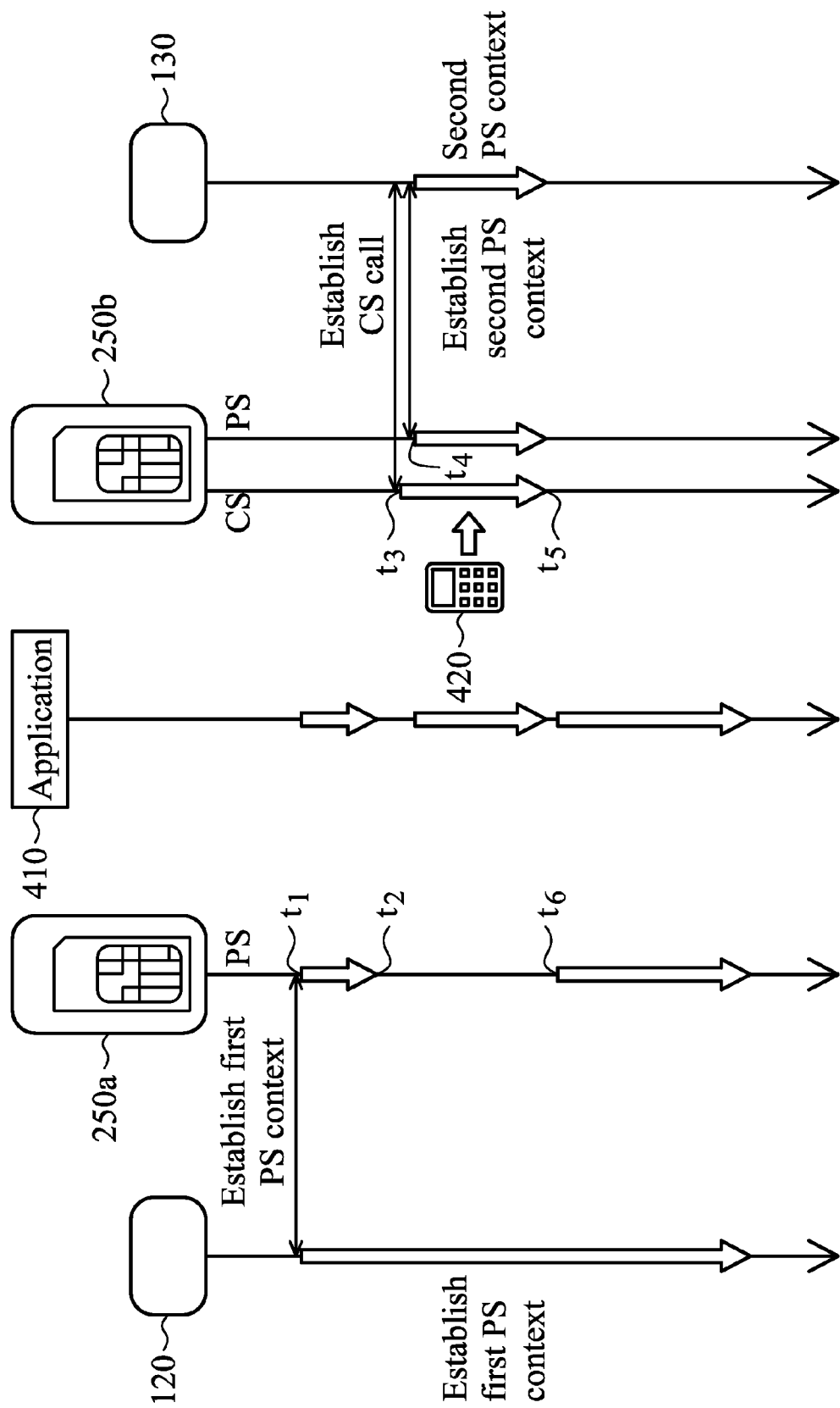
FIG. 4 depicts a schematic diagram of the PS (Packet-switched) context change and resume according to an embodiment of the invention.

FIG. 4 depicts a schematic diagram of the PS context change and resume according to an embodiment of the invention. Assume that the subscriber identity card 250*a* camps on a cell of the cellular network 120 while the subscriber identity card 250*b* camps on a cell of the cellular network 130: At moment $t_1$, the UE 110 establishes a PS context (referred as a first PS context through this example) between the first subscriber identity card 250*a* and the cellular network 120 to perform PS data transmission and reception for one or more applications 410. At moment $t_2$, the PS data transmission and reception with the first PS context is suspended when a call request related to the second subscriber identity card 250*b* is received. At moment $t_3$, a CS call connection is established to perform the CS data transmission and reception with a peer device 420. The CS call connection is maintained until moment $t_5$ at which the voice call is terminated. At moment $t_4$, the UE 110 establishes a PS context (referred as a second PS context through this example) between the subscriber identity card 250*b* and the cellular network 130 to continue the PS data transmission and reception for the application(s) 410. Although the illustrated moment $t_3$ is prior to moment $t_4$, it should be noted that the CS call connection may not be established successfully ahead of the second PS context establishment in practice, and it varies with the response times through the cellular network 130. Via the second PS context the application 410 can transmit and receive data packets through the cellular network 130. After the voice call is terminated at moment $t_5$, the second PS context is released and the first PS context is resumed at moment $t_6$. Thereafter, the application 410 transmits and receives PS with the first PS context through the cellular network 120.

Figure 5:
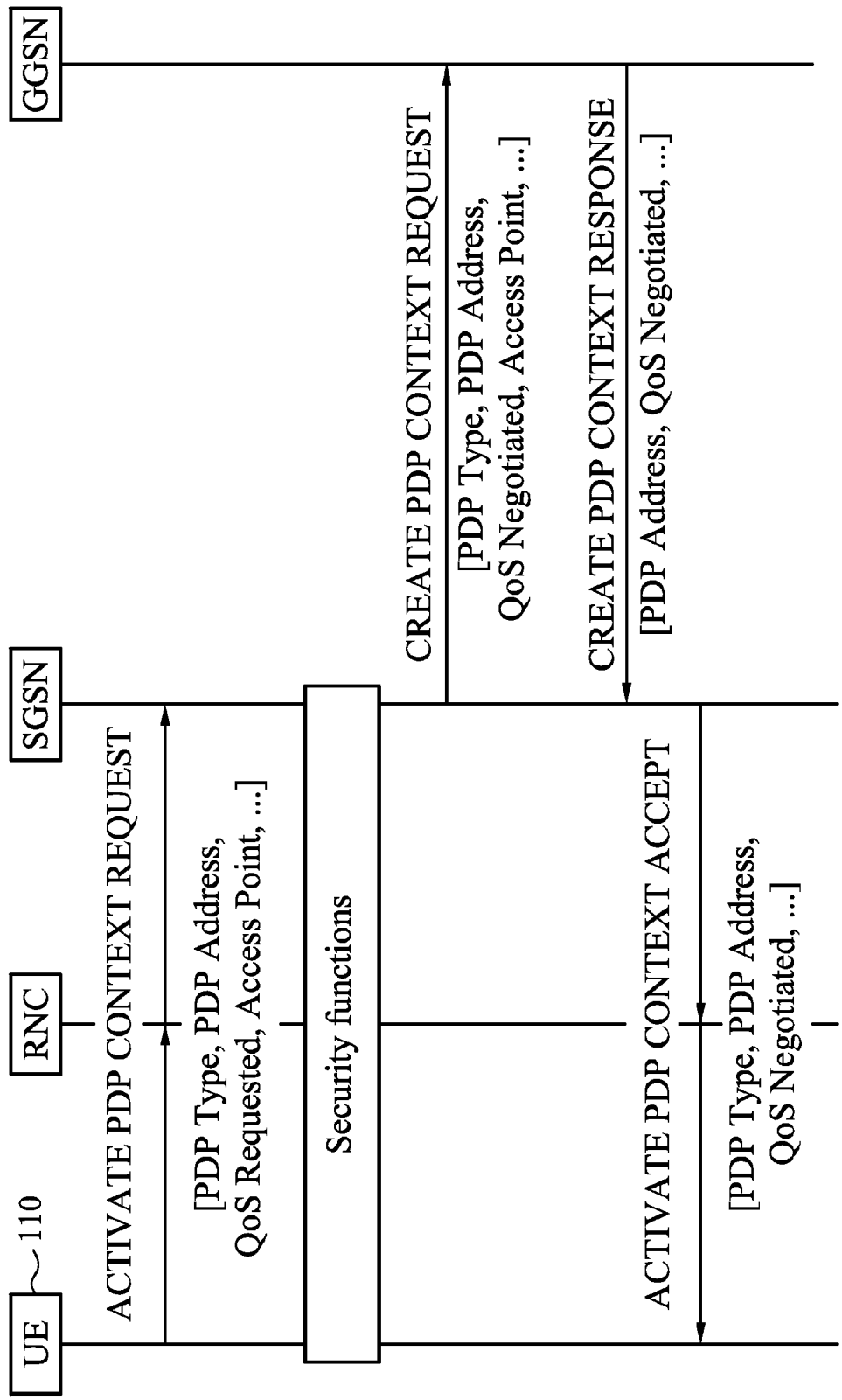
FIG. 5 is a diagram illustrating the PDP (Packet Data Protocol) context activation procedure initialized by the UE, which is applied in a 2G/3G system.

Details of step 5330 for establishing a PS service are described in the following. To exchange data packets with external PDNs (Public Data Networks) in the 2G/3G system after a successful GPRS attach procedure, the UE 110 applies for an address used in the PDN, wherein the address is called a PDP (Packet Data Protocol) address. In cases where the PDN is the Internet, the PDP address is an IP address. For each session, a PDP context is created, which describes the characteristics of the session. The PDP context describes PDP types (e.g. IPv4, IPv6 or others), wherein the PDP address is assigned to the UE 110, and the requested QoS (Quality of Service) class and the address of a GGSN (Gateway GPRS Support Node) that serves as the access point to the external network. FIG. 5 is a diagram illustrating the PDP context activation procedure initialized by the UE 110, which is applied in a 2G/3G system. With the ACTIVATE PDP CONTEXT REQUEST message, the UE 110 informs the SGSN (Serving GPRS Support Node) of the requested PDP context. After that, the typical security functions (e.g. authentication of the UE 110) are performed. If the access is granted, the SGSN will send a CREATE PDP CONTEXT REQUEST message to the affected GGSN. The GGSN creates a new entry in its PDP context table, which enables the GGSN to route data packets between the SGSN and the external PDN. Next, the GGSN confirms the request to the SGSN with a CREATE PDP CONTEXT RESPONSE message. Finally, the SGSN updates its PDP context table and confirms the activation of the new PDP context to the UE 110 with an ACTIVATE PDP CONTEXT ACCEPT message. Note that for the UE 110 using both CS and PS services, it may perform a combined GPRS/IMSI attach procedure. In the 4G system, to get NAS (Non-access stratum) services (for example, Internet connectivity) from the cellular network 130, the UE 110 initiates the Attach Procedure, which is mandatory for the UE 110 during the initial access of the cellular network 130. Once the Attach Procedure succeeds, a context is established for the UE 110, and a default bearer is established between the UE 110 and the PDN GW (gateway) and an IP address is allocated to the UE 110. After the UE 110 has IP connectivity, it can start using IP-based Internet services, such as packet data transmission and reception.

Figure 6:
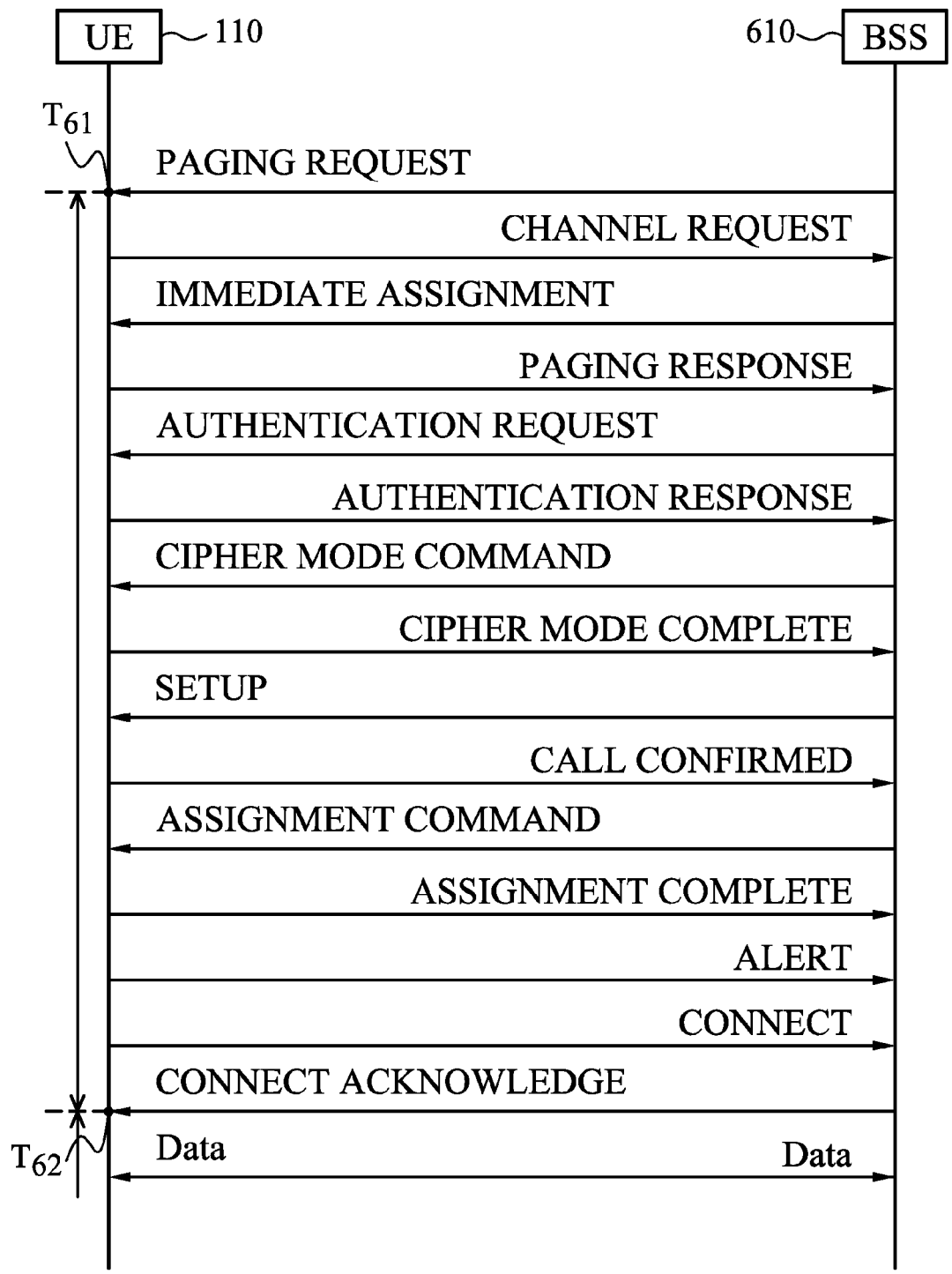
FIG. 6 shows signaling procedures for establishing an MT (Mobile-terminated) call connection in the GSM/GPRS/EDGE system according to an embodiment of the invention.

Exemplary timing of steps S310 and S340 for establishing an MT call connection in the GSM/GPRS/EDGE system, and timing of step S330 for establishing a PS service are discussed as follows. FIG. 6 shows signaling procedures for establishing an MT call connection in the GSM/GPRS/EDGE system according to an embodiment of the invention. When the UE 110 is being paged by a calling party, which means that the user of a peer wired or wireless device is planning to originate a CS call connection with the UE 110, the UE 110 first receives a PAGING REQUEST message from the BSS (base station system) 610 via a PCH (Paging Channel). The UE 110 next requests a MM (Mobility Management) connection via the RACH (Random Access Channel) if not yet done. The BSS 610 of the cellular network 130 may assign a SDCCH (Stand-alone Dedicated Control Channel) or a TCH (Traffic Channel) via an IMMEDIATE ASSIGNMENT message carried in the AGCH (Access Grant Channel), and the UE 110 responds with a PAGING RESPONSE message via the SDCCH to the BSS 610. After the process of authentication and ciphering with the UE 110 via the SDCCH is completed, an MM connection is established. After successful establishment of the MM connection and activation of the user data encryption, the UE 110 is informed by a Setup message from a MSC (mobile switching center, not shown) of the cellular network 130, and responds with a CALL CONFIRMED message to the MSC (not shown). The UE 110 next receives an ASSIGNMENT COMMAND message which indicates the allowance of assigning a dedicated channel, and the dedicated channel will be assigned after the UE 110 responds to an ASSIGNMENT COMPLETE message, an ALERT message, and a CONNECT message via a FACCH (Fast Associated Control Channel). When the UE 110 receives the CONNECT ACKNOWLEDGE message from the MSC (not shown), the dedicated channel is successfully established on the TCH, and the UE 110 may begin to communicate with the calling party. Receipt of the CONNECT ACKNOWLEDGE message may be considered as a signal that the MT call connection has been successfully established. As illustrated in FIG. 3, the call request in step S310 may be generated after a PAGING REQUEST message is received at moment $t_{61}$. The procedure for establishing a CS MT call connection recited in step S330 may refer to the aforementioned signaling interaction with the BSS 610 and MSC (not shown) between moments $t_{61}$ and $t_{62}$. The triggering timing of the PS service establishment recited in step S330 may occur between moments $t_{61}$ and $t_{62}$, or after the reception of the CONNECT ACKNOWLEDGE message at moment $t_{62}$. Triggering the PS service establishment between moments $t_{61}$ and $t_{62}$ may yield better packet data throughput than triggering that after moment $t_{62}$. Triggering the PS service establishment after moment $t_{62}$ may avoid unnecessary PS service handover when the UE 110 fails to establish a MT call connection with a peer device. In other words, the UE 110 can stop the aforementioned PS service handover if any exception happens before a CONNECT ACKNOWLEDGE message is received.

Figure 7:
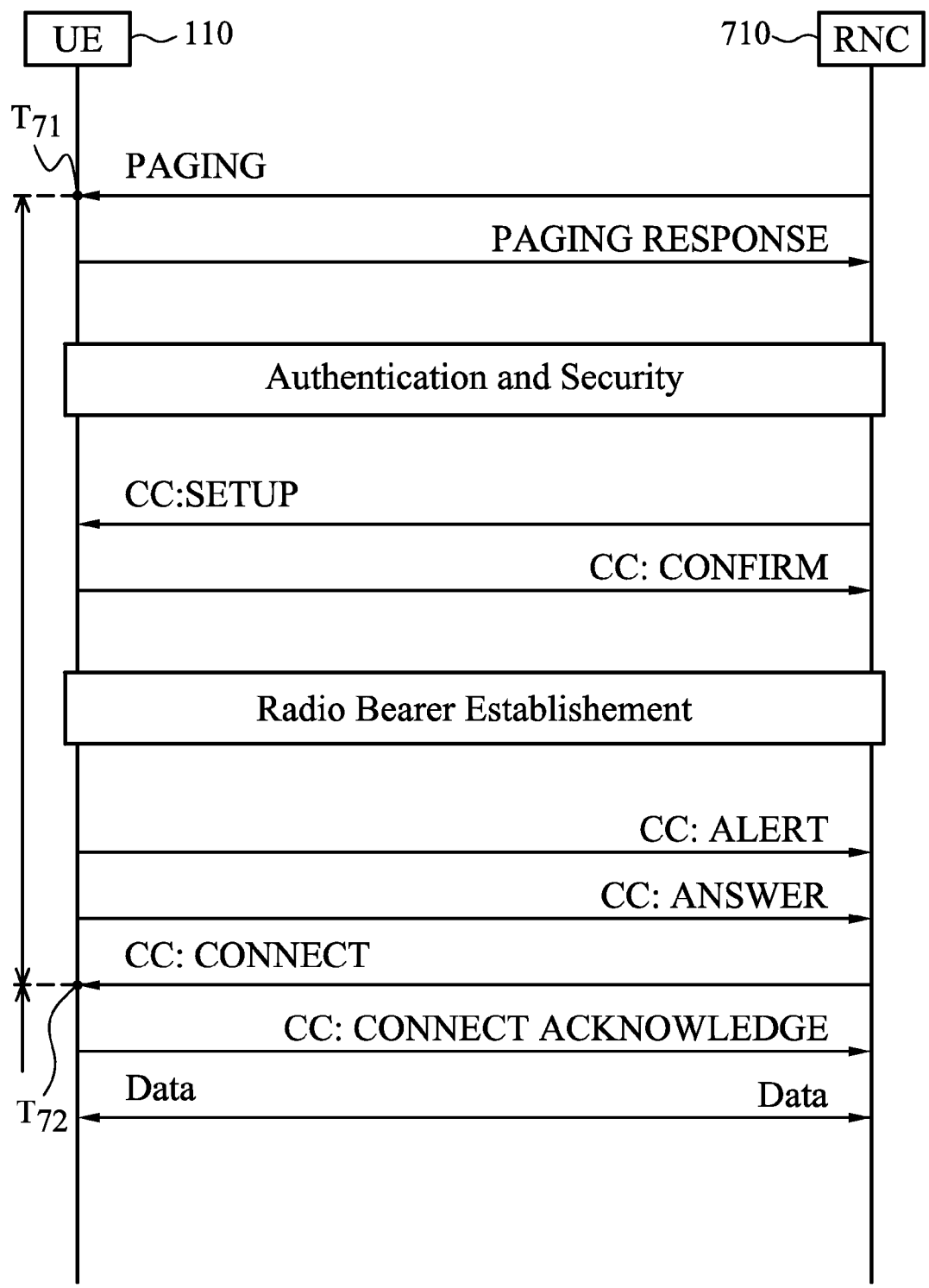
FIG. 7 shows signaling procedures for establishing an MT call connection in the UMTS system according to an embodiment of the invention.

Exemplary timing of steps S310 and S340 for establishing an MT call connection in the UMTS system, and timing of step S330 for establishing a PS service are discussed as follows. FIG. 7 shows signaling procedures for establishing a MT call connection in the UMTS system according to an embodiment of the invention. When the UE 110 is being paged by a calling party, the UE 110 first receives a PAGING message from the RNC (Radio Network Controller) 710 via a PCH. The UE 110 next establishes a RRC (Radio Resource Control) connection if not yet done. Then the UE 110 responds with a PAGING RESPONSE message conveyed by the container message INITIAL DIRECT TRANSFER via the DCCH (Dedicated Control Channel) to the RNC 710. After successful authentication and security procedures, the UE 110 is informed by a SETUP message conveyed by the container message DIRECT TRANSFER from a MSC (mobile switching center, not shown) of the cellular network 130, and responds with a CONFIRM message to the MSC (not shown). The UE 110 then sends an ALERT message and an ANSWER message to the RNC 710. When the UE 110 receives the CONNECT message from the MSC (not shown) and replies with a CONNECT ACKNOWLEDGE message, the dedicated channel is successfully established, and the UE 110 may begin to communicate with the calling party. Receipt of the CONNECT message may be considered as a signal that the MT call connection has been successfully established. As illustrated in FIG. 3, the call request in step S310 may be generated after a PAGING message is received at moment $t_{71}$. The procedure for establishing a CS MT call connection recited in step S340 may refer to the aforementioned signaling interaction with the RNC 710 and MSC (not shown) between moments $t_{71}$ and $t_{72}$. The triggering timing of the PS service establishment recited in step S330 may occur between moments $t_{71}$ and $t_{72}$, or after the reception of the CONNECT message at moment $t_{72}$. Triggering the PS service establishment between moments $t_{71}$ and $t_{72}$ may yield better packet data throughput than triggering that after moment $t_{72}$. Triggering the PS service establishment after moment $t_{72}$ may avoid unnecessary PS service handover when the UE 110 fails to establish a MT call connection with a peer device. In other words, the UE 110 can stop the aforementioned PS service handover if any exception occurs before a CONNECT message is received.

Figure 8:
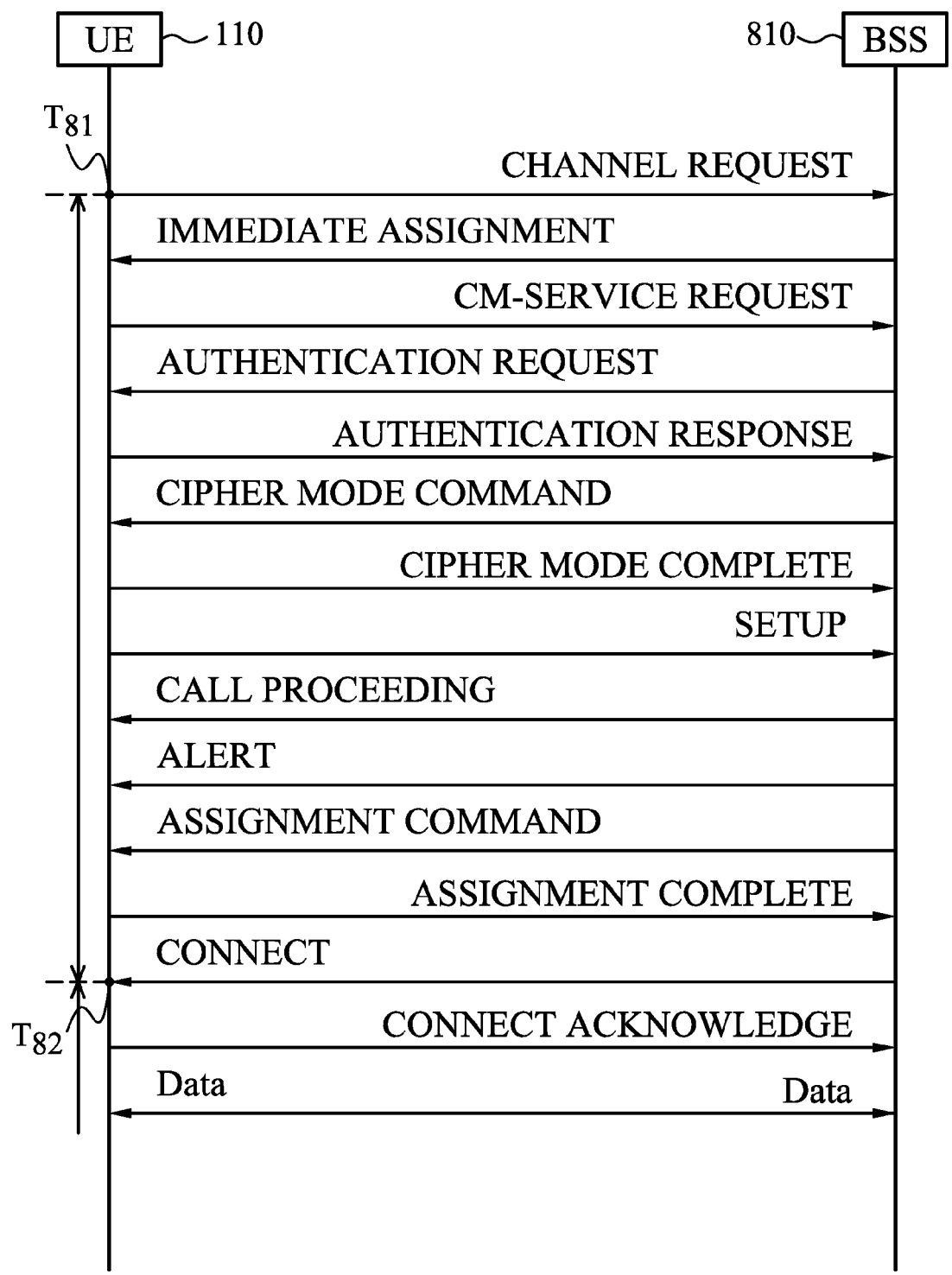
FIG. 8 shows signaling procedures for establishing an MO (Mobile-originated) call connection in the GSM/GPRS/EDGE system according to an embodiment of the invention.

Exemplary timing of steps S310 and S340 for establishing an MO call connection in the GSM/GPRS/EDGE system, and timing of step S330 for establishing a PS service are discussed as follows according to an embodiment of the invention. FIG. 8 shows signaling procedures for establishing a MO call connection in the GSM/GPRS/EDGE system according to an embodiment of the invention. When planning to originate a call connection, the UE 110 first requests a MM (Mobility Management) connection via a RACH (Random Access Channel). For a standard call, the UE 110 may need to register with the cellular network 130, whereas for an emergency call, registration is only optionally required. The BSS 810 in the cellular network 130 may assign a SDCCH (Stand-alone Dedicated Control Channel) or a TCH (Traffic Channel) via an IMMEDIATE ASSIGNMENT message carried in the AGCH (Access Grant Channel). After the process of sending out a CM-SERVICE REQUEST message, authentication and ciphering with a MSC (not shown) via the SDDCH is completed, an MM connection is established. After successful establishment of the MM connection and activation of the user data encryption, the service requesting CC (call control) entity is informed. Thus, the signals on the connection attempt to connect to the CC entity in the MSC (conveyed in the SETUP message). The MSC (not shown) may respond to the connection request in several ways. The MSC may indicate with a message CALL PROCEEDING that the call request has been accepted and that all the necessary information for the setup of the call is available. Otherwise, the call request may be declined with a message RELEASE COMPLETE. Next, the UE 110 receives the ALERT message when the MSC (not shown) is trying to connect to the called party. As soon as the called party sends the ALERT message and accepts the call, the UE 110 receives an ASSIGNMENT COMMAND message and a DCH (dedicated channel) will be assigned after the UE 110 responds to an ASSIGNMENT COMPLETE message via a FACCH (Fast Associated Control Channel). The UE 110 next responds with a CONNECT ACKNOWLEDGE message after receiving the CONNECT message from the MSC (not shown), and the TCH is successfully established. Receipt of the CONNECT message may be considered as a signal that the MO call connection has been successfully established. The UE 110 may begin to communicate with the called party. As illustrated in FIG. 3, the call request in step 5310 may be generated through a MMI at moment $t_{81}$, indicating that the user is attempting to make a MO call. The procedure for establishing a CS MO call connection recited in step S340 may be referred to in the aforementioned signaling interaction with the BSS 810 and MSC (not shown) between moments $t_{81}$ and $t_{82}$. The triggering timing of the PS service establishment recited in step S330 may occur between moments $t_{81}$ and $t_{82}$, or after the reception of the CONNECT message at moment $t_{82}$. Triggering the PS service establishment between moments $t_{81}$ and $t_{82}$ may yield better packet data throughput than triggering that after moment $t_{82}$. Triggering the PS service establishment after moment $t_{82}$ may avoid unnecessary PS service handover when the UE 110 fails to establish a MO call connection with a peer device. In other words, the UE 110 can stop the aforementioned PS service handover if any exception happens before a CONNECT message is received.

Figure 9:
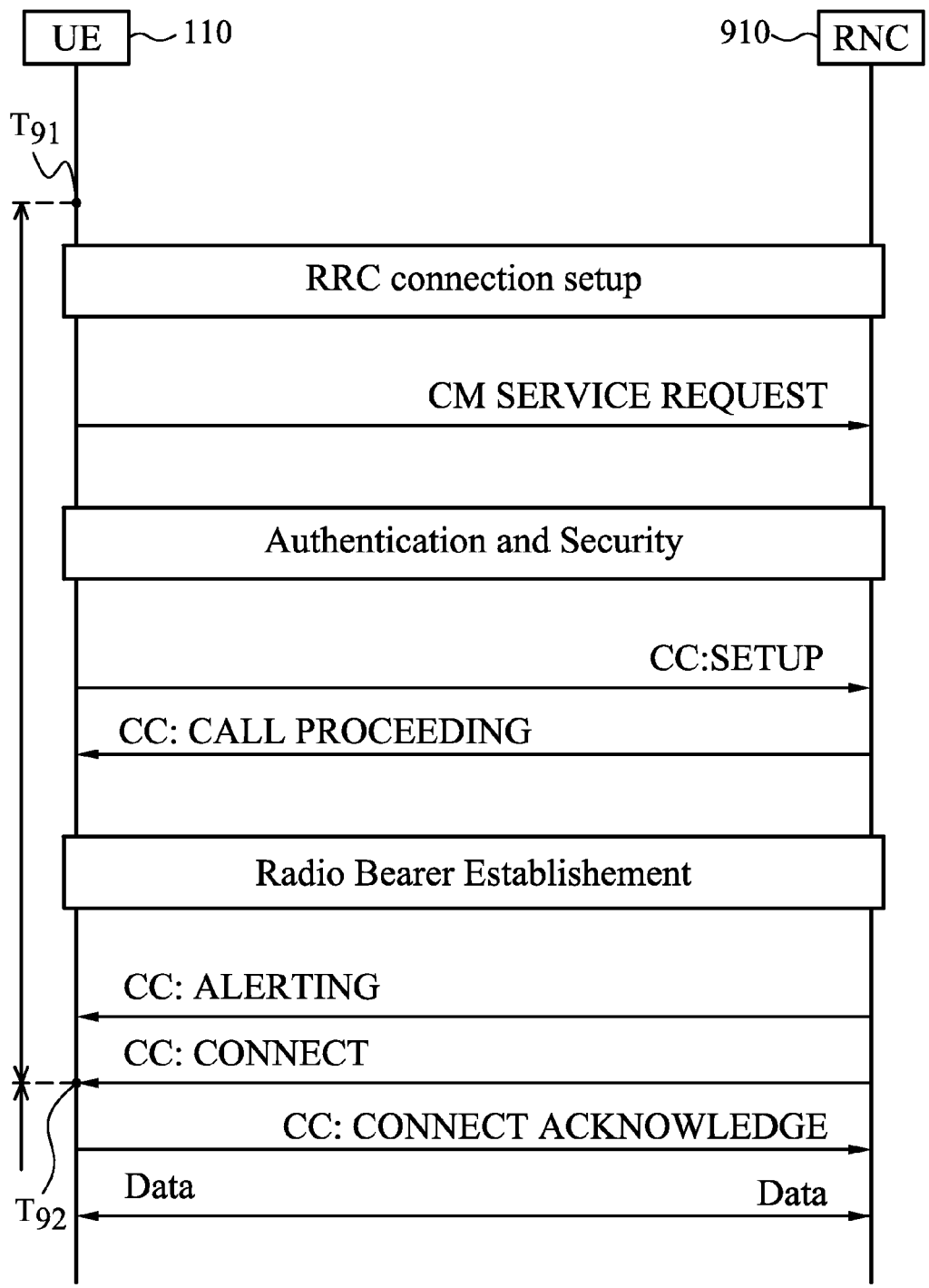
FIG. 9 shows signaling procedures for establishing an MO call connection in the UMTS system according to an embodiment of the invention.

Exemplary timing of steps S310 and S340 for establishing an MO call connection in the UMTS system, and timing of step S330 for establishing a PS service are discussed as follows. FIG. 9 shows signaling procedures for establishing a MO call connection in the UMTS system according to an embodiment of the invention. When planning to originate a call connection, the UE 110 first initiates a call establishment procedure by sending a message SERVICE REQUEST conveyed by the container message INITIAL DIRECT TRANSFER to the RNC 910. After authentication and security operations, the UE 110 sends to the MSC (not shown) through the RNC 910 the message SETUP which contains relevant information for the call establishment. The MSC (not shown) may send to the UE 110 a CALL PROCEEDING message to indicate that the call establishment request has been accepted and is being processed. If required for the requested service, radio bearers are then established. The MSC (not shown) may send to the UE 110 an ALERTING message when the alerting of the called party is started. After the called party accepts the call, the UE 110 is indicated by a message CONNECT from the MSC (not shown) and then replies with a message CONNECT ACKNOWLEDGE. Receipt of the CONNECT message may be considered as a signal that the MO call connection has been successfully established. The UE 110 may begin to communicate with the called party. As illustrated in FIG. 3, the call request in step S310 may be generated through a MMI at moment $t_{91}$, indicating that the user is attempting to make a MO call. The procedure for establishing a CS MO call connection recited in step S340 may refer to the mentioned signaling interaction with the RNC 910 and MSC (not shown) between moments $t_{91}$ and $t_{92}$. The triggering timing of the PS service establishment recited in step S330 may occur between moments $t_{91}$ and $t_{92}$, or after the reception of the CONNECT message at moment $t_{92}$. Triggering the PS service establishment between moments $t_{91}$ and $t_{92}$ may yield better packet data throughput than triggering that after moment $t_{92}$. Triggering the PS service establishment after moment $t_{92}$ may avoid unnecessary PS service handover when the UE 110 fails to establish a MO call connection with a peer device. In other words, the UE 110 can stop the aforementioned PS service handover if any exception happens before a CONNECT message is received.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for call management, performed by a processing unit of a UE (user equipment), wherein the UE is equipped with a first subscriber identity card and a second subscriber identity card, which share a radio resource, comprising:
   providing a first PS (packet-switched) service for the first subscriber identity card;
   handing over packet data transmission and reception to a second PS service with the second subscriber identity card from the first PS service after receiving a call request requesting a CS (circuit-switched) service with the second subscriber identity card,
   wherein the handing-over step further comprises:
   performing a NAT (network address transition) after receiving the call request wherein the NAT replaces a destination address of an incoming packet with a first address corresponding to the first SIM and replaces a source address of a outputting packet with a second address corresponding to the second SIM; and
   canceling the NAT after the second PS service is released, and maintaining the NAT when the first services is terminated.

2. The method of claim 1, wherein the handing-over step further comprises:
   establishing the second PS service for the second subscriber identity card after receiving the call request;
   establishing the CS service for the second subscriber identity card after receiving the call request; and
   utilizing the second PS service to continue the packet data transmission and reception.

3. The method of claim 2, wherein the handing-over step further comprises:
   suspending the first PS service after receiving the call request;
   releasing the second PS service after the CS service is terminated; and
   resuming the first PS service after the CS service is terminated.

4. The method of claim 2, further comprising:
   releasing the first or second PS service after the CS service is terminated.

5. The method of claim 2, wherein the second PS service is established by performing a PDP (Packet Data Protocol) context activation procedure for a 2G or 3G system, or an Attach procedure for a 4G system.

6. The method of claim 1, wherein the triggering moment for establishing the second PS service is between receiving the call request and receiving a message from a MSC (mobile switching center), which indicates that the CS service is successfully established.

7. The method of claim 1, wherein the triggering moment for establishing the second PS service is between receipt of the call request and receipt of a message indicating that the CS service is successfully established.

8. The method of claim 1, wherein the triggering moment for establishing the second PS service is after receipt of a message indicating that the CS service is successfully established.

9. The method of claim 1, wherein the call request is generated after a PAGING REQUEST or PAGING message is received.

10. The method of claim 1, wherein the call request is generated through a MMI (man-machine interface), indicating that a user attempts to make a MO (mobile-originated) call.

11. The method of claim 1, wherein the first and second PS services are provided by different network operators and the second PS service and the CS service are provided by the same network operator.

12. The method of claim 1, wherein the method is performed in a MAC (Media Access Control) layer.

13. An apparatus for call management with a first subscriber identity card and a second subscriber identity card, which share a radio resource, comprising:
a processing unit, providing a first PS (packet-switched) service for the first subscriber identity card via the shared radio resource, and handing over packet data transmission and reception via the shared radio resource to a second PS service for the second subscriber identity card from the first PS service after receiving a call request requesting a CS (circuit-switched) service with the second subscriber identity card,
wherein the processing unit further performs a NAT (network address transition after receiving the call request wherein the NAT replaces a destination address of an incoming packet with a first address corresponding to the first SIM and replaces a source address of a outputting packet with a second address corresponding to the second SIM, and
canceling the NAT after the second PS service is released, and maintaining the NAT when the first service is terminated.

14. The apparatus of claim 13, wherein the processing unit establishes the second PS service for the second subscriber identity card after receiving the call request, establishes the CS service for the second subscriber identity card after receiving the call request, and utilizes the second PS service to continue the packet data transmission and reception.

15. The apparatus of claim 14, wherein the processing unit further suspends the first PS service after receiving the call request, releases the second PS service after the CS service is terminated, and resumes the first PS service after the CS service is terminated.

16. The apparatus of claim 14, wherein the processing unit further releases the first or second PS service after the CS service is terminated.

\* \* \* \* \*